United States Patent [19]
Kelly

[11] 3,814,462
[45] June 4, 1974

[54] ANTI-THEFT BICYCLE FRAME

[76] Inventor: James J. Kelly, 625 Valley View Rd., Oak Park, Ill. 19047

[22] Filed: Mar. 16, 1973

[21] Appl. No.: 342,068

[52] U.S. Cl.................. 280/287, 403/323, 403/362
[51] Int. Cl............................................. B62k 15/00
[58] Field of Search.................. 280/287, 278, 261; 403/323, 361, 362, 378, 379

[56] References Cited
UNITED STATES PATENTS
675,765    6/1901    Barry .............................. 403/362 X FOREIGN PATENTS OR APPLICATIONS
360,530    3/1938    Italy .................................. 280/278
11,140    11/1952    Germany .......................... 280/278
883,836    4/1943    France ............................... 280/287

*Primary Examiner*—Leo Friaglia
*Assistant Examiner*—Jack D. Rubenstein
*Attorney, Agent, or Firm*—Edmond T. Patnaude

[57] ABSTRACT

A bicycle frame has a two-part horizontal frame member or crossbar, a forwardly extending diagonal frame member pivotally connected to the pedal crank housing and a keylock connecting the two crossbar pieces together so that opening of the lock permits the frame to be opened, placed around a permanently located pole or the like and then re-locked to prevent removal of the bicycle without opening the lock.

5 Claims, 6 Drawing Figures

PATENTED JUN 4 1974  3,814,462

3,814,462

ANTI-THEFT BICYCLE FRAME

The present invention relates in general to anti-theft devices for bicycles, and it relates more particularly to a bicycle frame which can be locked to a permanently located structure to prevent theft of the bicycle.

BACKGROUND OF THE INVENTION

Historically, the concept of anti-theft devices for bicycles has been based on the principle of increasing the time and effort required to steal the bicycle so that detection of the thief is likely. Accordingly, various types of locking devices have been developed to render the bicycle inoperative or to secure it to a permanently located structure. Statistics show that such locking devices have not been successful deterrents to bicycle theft, even when used. Moreover, they are generally expensive, cumbersome, unsightly and heavy. It would, therefore, be desirable to provide a new and improved anti-theft device incorporated into the bicycle itself so as to be always available for use, to be relatively inconspicuous and to prevent the theft of the bicycle except by substantially damaging the bicycle itself or at least making it unusable until repaired.

OBJECTS OF THE INVENTION

Therefore, a principal object of the present invention is to provide a new and improved bicycle frame construction incorporating a key or combination lock which holds the frame in a unitary condition.

Another object of this invention is to provide a bicycle frame which is conventional in appearance but which can be unlocked, opened, placed around a permanent structure, reclosed and locked to prevent removal of the frame from the structure without breaking the frame.

A further object of this invention is to provide a bicycle frame of generally triangular construction wherein two of the frame members are pivotally connected together and the third frame member includes two separate pieces connected together by a lock means, so that opening of the lock permits the frame to be pivoted open for placement and relocking around a permanent structure such as a pole.

SUMMARY OF THE INVENTION

Briefly, the above and further objects of the present invention may be realized by providing a generally triangular bicycle frame including a pedal crank housing to which the forwardly extending frame piece is pivotally connected, and a two-piece horizontal crossbar incorporating a locked connection between the crossbar pieces.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE DRAWING

Figure 1:
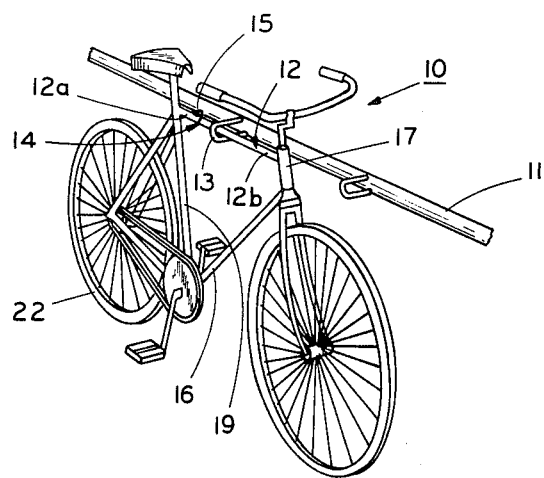
FIG. 1 is a perspective view of a bicycle embodying the present invention and locked to a horizontal bar.

Referring now to the drawing and particularly to FIG. 1 thereof, a bicycle 10 embodying the present invention is locked to a horizontal bar 11 which is permanently located in any suitable manner. As shown, the horizontal crossbar 12 of the bicycle frame extends through one of a plurality of U-shaped elements 13 which are fixedly connected to the bar 11 as by welding. The horizontal crossbar 12 is split at 14 to provide a rear portion 12a and a forward portion 12b which are held in aligned locked engagement by a lock 15. As illustrated in the drawing, the lock 15 is key operated but it will be understood that a combination lock can also be used for this purpose.

In order to lock the bicycle 10 to the horizontal bar 11 or to some other permanently located structure, the lock 15 is unlocked so that the portions 12a and 12b can be separated. This is possible since, as more fully described hereinafter, the forwardly extending diagonal frame piece 16 of the bicycle frame which is fixed to the frame head 17 is pivotally connected at its lower end to the pedal crank housing. With the frame opened the horizontal bar portion 12b may be placed around any permanently located object such, for example, as a utility pole and then relocked to the rear bar portion 12a. The bicycle can then only be removed from the permanent structure by cutting through the horizontal crossbar 12 thereby making the bicycle inoperative. If desired, a steel rod may be loosely positioned within the horizontal bar 12 making it extremely difficult to saw through the frame member.

Figure 2:
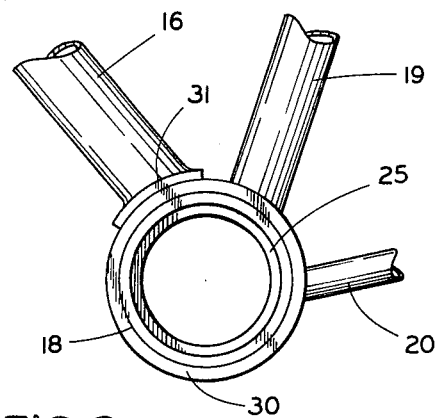
FIG. 2 is a fragmentary, enlarged end view of the pedal crank housing and associated frame members of the bicycle shown in FIG. 1.
Figure 3:
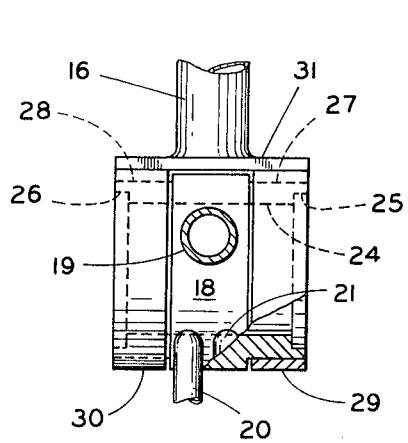
FIG. 3 is a front view of the portion of the frame shown in FIG. 2 and taken from the right-hand side thereof.

Referring to FIGS. 2 and 3, the forwardly extending diagonal frame member 16 is pivotally connected to the pedal crank housing 18 to which a substantially vertical frame piece 19 is fixedly connected as by welding. The rearwardly extending fork frame pieces 20 and 21 to which the rear wheel 22 is connected are also fixed as by welding to the pedal crank housing 18. The pedal crank housing 18 is generally tubular having a central bore 24 counterbored at the ends 25 and 26 for receiving ball bearings for rotatably supporting the pedal crank within the housing. The ends of the crank housing 18 are turned down to provide annular bearing surfaces 27 and 28 of reduced external diameter over which a pair of rings 29 and 30 are rotatably mounted. An arcuate plate 31 is welded to the rings 29 and 30 to hold them in assembled relationship on the housing 18 and the diagonal frame piece 16 is welded at its lower end to the plate 31. Consequently, the frame piece 16 is pivotally connected via the rings 29 and 30 to the pedal crank housing 18.

Figure 4:
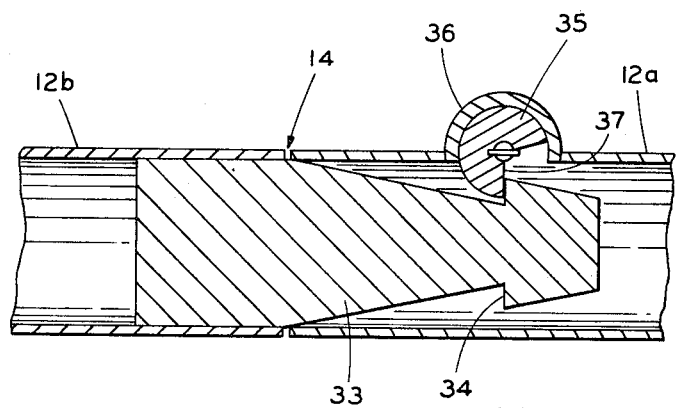
FIG. 4 is a vertical section of the portion of the horizontal crossbar including a lock connection.

Referring to FIG. 4, the forward portion 12b of the horizontal crossbar 12 has mounted in the rear end thereof a male locking member 33 which is insertable into the forward end of the rear horizontal bar piece 12a. Locking member 33 has a forwardly facing shoulder 34 which is adapted to be engaged by a pawl 35 which is rotatable in a lock housing 36 fixed as by welding to the horizontal bar piece 12a by means of a key or by a conventional combination locking mechanism.

Figure 5:
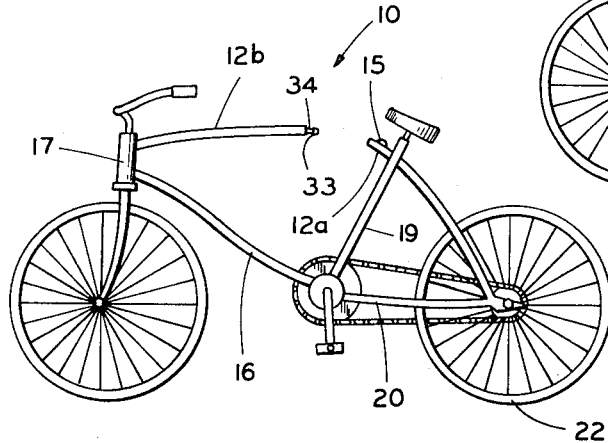
FIG. 5 is an elevational view of the bicycle of FIG. 1 in a partially open condition.
Figure 6:
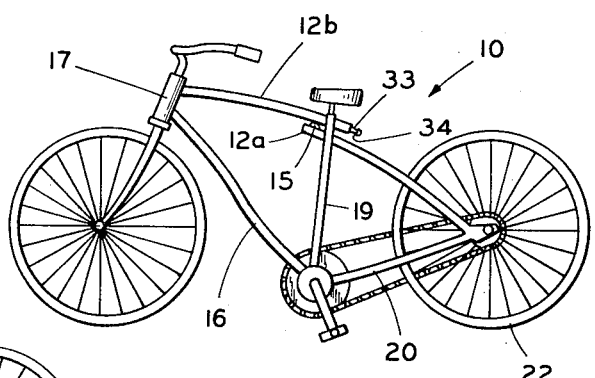
FIG. 6 is a view like that of FIG. 5 but showing the frame in a partially folded condition.

In FIG. 4 the pawl 35 is shown in a locked position wherein the locking surface 37 engages the shoulder 34 to prevent disassembly of the frame pieces 12a and 12b. When the pawl 35 is rotated by the key or the like through an angle of about 45° the dog 33 is released whereby the frame pieces 12a and 12b can be disassembled. As the part 12b is moved forwardly of the part 12a the forward portion of the bicycle including the diagonal frame member 16 pivots about the crank housing 18 thereby opening the bicycle frame into the condition shown in FIG. 5. When in this condition the frame may be placed around a vertical structure such as a utility pole, or the forward horizontal bar portion 12a may be inserted through suitable locking means such as the U-shaped members 13 of FIG. 1. With the frame unlocked it is also possible to pivot the forward portion of the bicycle rearwardly into a partially folded condition as illustrated in FIG. 6. Similarly, the bicycle frame can be folded up by pivoting the front portion downwardly until the front tire engages or overlaps the rear tire. In these conditions the overall dimensions of the bicycle are less and the bicycle may be conveniently stored in a smaller space than would otherwise accommodate it.

As illustrated in the drawing, the horizontal bar frame portion 12a is relatively short so that the lock is located beneath the bicycle seat where it is inconspicuous. Operationally, the separation 14 between the horizontal bar parts can be anywhere along the horizontal bar and if placed at approximately the center of the bar than the average bicycle can be folded up into a more compact condition since the rear end of the forward bar portion 12b does not engage the rear fender or carrier on the bicycle as soon as does the longer forward bar section as shown in the drawings. Also, it will be noted that it is possible to provide the pivotal connection between the three triangular frame pieces under the seat and to provide the locking connection on the diagonal forwardly extending frame piece 16. While this arrangement is operationally satisfactory, it has the disadvantage that a portion of the bicycle must be lifted off the ground in order to open the frame while the bike is in an upright position and the appearance of the resulting bicycle is quite different from normal and the cost of providing a strong pivotal connection at the top of the bicycle frame under the seat is substantially greater than that required to provide the connection at the crank housing.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. An anti-theft bicycle frame construction, comprising
   a crank housing for rotatably supporting a pedal crank,
   a frame head,
   a diagonally extending front frame member connected at its upper end to said frame head,
   an upright frame member,
   one of said frame members being fixedly connected at its lower end to said crank housing,
   the other of said frame members being pivotally connected at its lower end to said crank housing,
   a pair of horizontal frame pieces,
   one of said frame pieces being fixedly connected at one end to the upper portion of said upright frame member,
   the other of said frame pieces being fixedly connected at one end to said frame head, and
   lock means interlocking said frame pieces in mutual alignment whereby unlocking of said lock means permits opening of said frame by pivoting said frame members away from one another.

2. An anti-theft bicycle frame according to claim 1, wherein said lock means comprises
   a bayonet type lock having male and female interlocking members mounted at the mutually adjoining ends of said frame pieces.

3. An anti-theft bicycle frame construction as set forth in claim 1, wherein
   said upright frame member is the said frame member fixedly connected to said crank housing.

4. An anti-theft bicycle frame construction as set forth in claim 3, further comprising
   a rear wheel supporting fork extending rearwardly from said crank housing,
   a front wheel fork depending from and journaled in said frame head, and
   a seat mounted to said upright member.

5. An anti-theft bicycle frame according to claim 4, wherein
   said lock means is located directly beneath said seat.

* * * * *

UNITED STATES PATENT OFFICE
CERTIFICATE OF CORRECTION

Patent No. 3,814,462　　　　　　　Dated June 4, 1974

Inventor(s) JAMES J. KELLY

It is certified that error appears in the above-identified patent and that said Letters Patent are hereby corrected as shown below:

Inventor: "Oak Park, Ill. 19047" should read
--Langhorne, Pennsylvania 19047"

Signed and sealed this 26th day of November 1974.

(SEAL)
Attest:

McCOY M. GIBSON JR.　　　　　　　C. MARSHALL DANN
Attesting Officer　　　　　　　　Commissioner of Patents